(12) United States Patent
Ferrer et al.

(10) Patent No.: US 10,908,921 B2
(45) Date of Patent: *Feb. 2, 2021

(54) DATA PROCESSING METHOD AND SYSTEM FOR INTERCEPTING SIGNALS BETWEEN A PERIPHERAL DEVICE AND A SOFTWARE APPLICATION

(71) Applicant: SPARKLE CS LTD., Harrow (GB)

(72) Inventors: Judd Ferrer, Beckingham (GB); Mark Brighton, Basingstoke (GB)

(73) Assignee: SPARKLE CS LTD, Harrow (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/237,928

(22) Filed: Jan. 2, 2019

(65) Prior Publication Data
US 2019/0272177 A1 Sep. 5, 2019

Related U.S. Application Data

(63) Continuation of application No. 14/912,276, filed as application No. PCT/GB2014/052501 on Aug. 14, 2014, now Pat. No. 10,203,965.

(30) Foreign Application Priority Data

Aug. 16, 2013 (GB) .................................. 1314733.5

(51) Int. Cl.
*G06F 3/00* (2006.01)
*G06F 9/445* (2018.01)
(Continued)

(52) U.S. Cl.
CPC ............ *G06F 9/445* (2013.01); *G06F 9/4411* (2013.01); *G06F 9/44505* (2013.01);
(Continued)

(58) Field of Classification Search
CPC ...... G06F 9/445; G06F 9/4411; G06F 13/122; G06F 9/455; G06F 13/102; G06F 9/44505
See application file for complete search history.

(56) References Cited

U.S. PATENT DOCUMENTS

| | | | |
|---|---|---|---|
| 6,360,138 B1 | 3/2002 | Coppola | |
| 2005/0233797 A1* | 10/2005 | Gilmore | G06Q 20/202 463/17 |

(Continued)

FOREIGN PATENT DOCUMENTS

| | | |
|---|---|---|
| EP | 1 594 052 | 11/2005 |
| EP | 2 426 593 | 3/2012 |

OTHER PUBLICATIONS

International Search Report for PCT/GB2014/052501 dated Nov. 13, 2014, four (4) pages.

(Continued)

*Primary Examiner* — Jing-Yih Shyu
(74) *Attorney, Agent, or Firm* — Nixon & Vanderhye, P.C.

(57) ABSTRACT

The present invention relates to a data processing method, including the steps of intercepting a signal within a communications channel between a predefined peripheral device for a computing system and an application executing on the computing system and processing the signal and performing one or more actions in response to the processing. At least one action affects onward transmission of one or more signals within the communications channel. A data processing system is also described.

24 Claims, 9 Drawing Sheets

(51) Int. Cl.
  *G06F 13/10*    (2006.01)
  *G06F 13/12*    (2006.01)
  *G06F 9/455*    (2018.01)
  *G06F 9/4401*   (2018.01)

(52) U.S. Cl.
  CPC ............ *G06F 9/455* (2013.01); *G06F 13/102* (2013.01); *G06F 13/122* (2013.01)

(56) References Cited

U.S. PATENT DOCUMENTS

| | | |
|---|---|---|
| 2005/0257226 A1 | 11/2005 | Belvin |
| 2007/0027560 A1 | 2/2007 | Nakazawa et al. |
| 2007/0050751 A1 | 3/2007 | Husmann |
| 2007/0100936 A1 | 5/2007 | Lum |
| 2007/0160200 A1* | 7/2007 | Ishikawa ............ H04L 63/0428 380/30 |
| 2007/0229519 A1 | 10/2007 | De Souza et al. |
| 2008/0148383 A1 | 6/2008 | Pitchaikani et al. |
| 2008/0283590 A1* | 11/2008 | Oder, II ............ G06Q 20/20 235/380 |
| 2009/0113145 A1* | 4/2009 | Slater ............ G06F 11/1451 711/154 |
| 2009/0187847 A1 | 7/2009 | Mercer |
| 2010/0010905 A1* | 1/2010 | Arzumanyan ..... G06Q 20/0453 705/21 |
| 2011/0184822 A1* | 7/2011 | Matkovic ............ G06Q 20/202 705/18 |
| 2011/0214131 A1 | 9/2011 | Luna |
| 2011/0246284 A1* | 10/2011 | Chaikin ............ G06O 20/105 705/14.38 |
| 2012/0016856 A1* | 1/2012 | Gandhi ............ G06Q 20/20 707/705 |
| 2012/0057184 A1* | 3/2012 | Furuhata ............ G06F 3/1205 358/1.13 |
| 2012/0216072 A1* | 8/2012 | Zeigler ............ G06F 11/0757 714/15 |
| 2012/0246472 A1* | 9/2012 | Berengoltz ......... G06F 11/1448 713/165 |
| 2012/0270538 A1 | 10/2012 | Meylan et al. |
| 2013/0013390 A1* | 1/2013 | Paulson-Ellis ..... G06Q 30/0268 705/14.38 |
| 2013/0041831 A1* | 2/2013 | Das ............ G06Q 20/20 705/72 |
| 2013/0304553 A1* | 11/2013 | Hertel ............ G06Q 30/02 705/14.23 |
| 2014/0222545 A1* | 8/2014 | Hajji ............ G06Q 20/20 705/14.38 |

OTHER PUBLICATIONS

Written Opinion of the ISA for PCT/GB2014/052501 dated Nov. 13, 2014, nine (9) pages.
Office Action dated Aug. 27, 2018, issued in U.S. Appl. No. 14/912,282.
Office Action dated Jan. 24, 2018, issued in U.S. Appl. No. 14/912,282.
International Search Report for PCT/GB2014/052499 dated Nov. 14, 2014, four (4) pages.
Written Opinion of the ISA for PCT/GB2014/052499 dated Nov. 14, 2014, four (4) pages.

* cited by examiner

Structure of the Token Packet 600

| Sync 8 or 32 bits | PID 8 bits | ADDR 7 bits | ENDP 4bits | CRC5 5 bits | EOP |

Structure of the Data Packet 601

| Sync 8 or 32 bits | PID 8 bits | Data up to 1024 bytes | CRC 16 16 bits | EOP |

Structure of the Status Packet 602

| Sync 8 or 32 bits | PID 8 bits | EOP |

FIG. 6

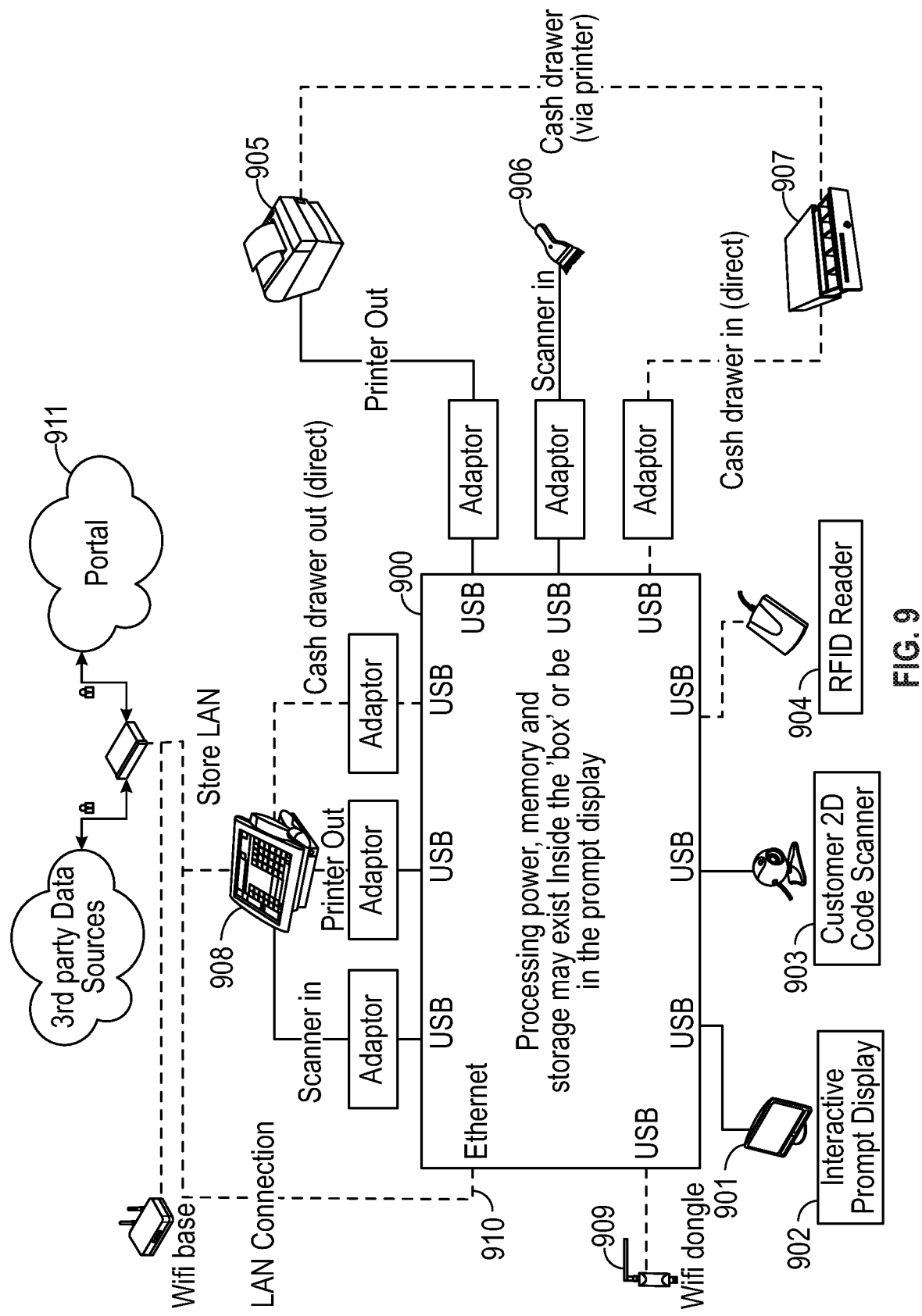

DATA PROCESSING METHOD AND SYSTEM FOR INTERCEPTING SIGNALS BETWEEN A PERIPHERAL DEVICE AND A SOFTWARE APPLICATION This application is a continuation of U.S. patent application Ser. No. 14/912,276 filed Feb. 16, 2016, now U.S. Pat. No. 10,203,965; which is the U.S. national phase of International Application No. PCT/GB2014/052501 filed Aug. 14, 2014; and claims priority to GB Patent Application No. 1314733.5 filed Aug. 16, 2013. The disclosures of these applications are incorporated herein in their entirety by reference.

FIELD OF INVENTION

The present invention is in the field of data processing. Particularly, but not exclusively, the present invention relates to the interception and processing of data from a hardware device in a computing system.

BACKGROUND

It is often desirable to add functionality to deployed technology architectures. However, introducing new functionality often requires substantial modification to the already deployed technology. Modification is generally undesirable as it can introduce unexpected effects within interoperating technology and increase the chances of errors occurring within complex technology.

One field which finds it challenging to improve functionality is the retail sector, particularly in regard to their point-of-sale terminals which tend to be installed and operated by monopoly technology providers.

Retail is, conversely, a field which would derive tremendous advantage from new processes. For example, coupons in new forms have attracted the interest and engagement of consumers. Retailers would like to implement new and intelligent processes for managing coupons in their stores.

Accordingly, there is a desire for additional functionality deploying new processes to be added to legacy computing systems, in particular in retail.

With couponing, there are several improvements that would usefully improve the functionality of existing retail systems. For example, it may be desirable to apply discounts to particular items of a basket or other complex rules to discounts, or it may be useful for coupons to trigger specific prompts to the terminal operator.

To implement these improvements, an improved data processing method and system which is easily deployed into legacy environments is required.

It is an object of the present invention to provide a data processing system which overcomes the disadvantages of the prior art, or at least provides a useful alternative.

SUMMARY OF INVENTION

According to a first aspect of the invention there is provided a data processing method including: intercepting a signal within a communications channel between a predefined peripheral device for a computing system and an application executing on the computing system; and processing the signal and performing one or more actions in response to the processing; wherein at least one action affects onward transmission of one or more signals within the communications channel.

According to a further aspect of the invention there is provided a data processing system comprising: an interceptor module configured for intercepting signals within a communications channel between a predefined peripheral device for a computing system and an application executing on the computing system; and a processor configured for processing the intercepted signals and performing one or more actions in response to the processing; wherein at least one of the actions affects onward transmission of one or more signals within the communications channel.

Other aspects of the invention are described within the claims.

BRIEF DESCRIPTION OF THE DRAWINGS

Embodiments of the invention will now be described, by way of example only, with reference to the accompanying drawings in which:

FIG. 6: shows a block diagram illustrating a message format of signals used within an embodiment of the invention;

FIG. 9: shows a data processing system in accordance with an embodiment of the invention.

DETAILED DESCRIPTION OF PREFERRED EMBODIMENTS

The present invention provides a data processing system.

The inventors have discovered that additional functionality can be added to legacy POS systems without substantial changes being made to those legacy systems by intercepting signals within communication channels between the POS systems and their peripherals.

For example, when a barcode scanner reads a coupon it transmits a message encoding the coupon barcode to the POS application executing on the POS terminal. One implementation of the invention can intercept that message, and use it to provide additional couponing functionality, whether by sending the data to a central server or by generating different messages to send to the POS application.

The inventors have discovered that the invention results in the ability to accommodate new data flows within existing computing systems without requiring changes to: the application software utilising the data flow, in some cases the peripherals providing the data flow, and even any existing data flows. Due to this innovation, these improved computing systems can receive unexpected data within signals to/from peripherals and utilise this data without the unexpected data causing system or peripheral errors or failures.

Figure 1:
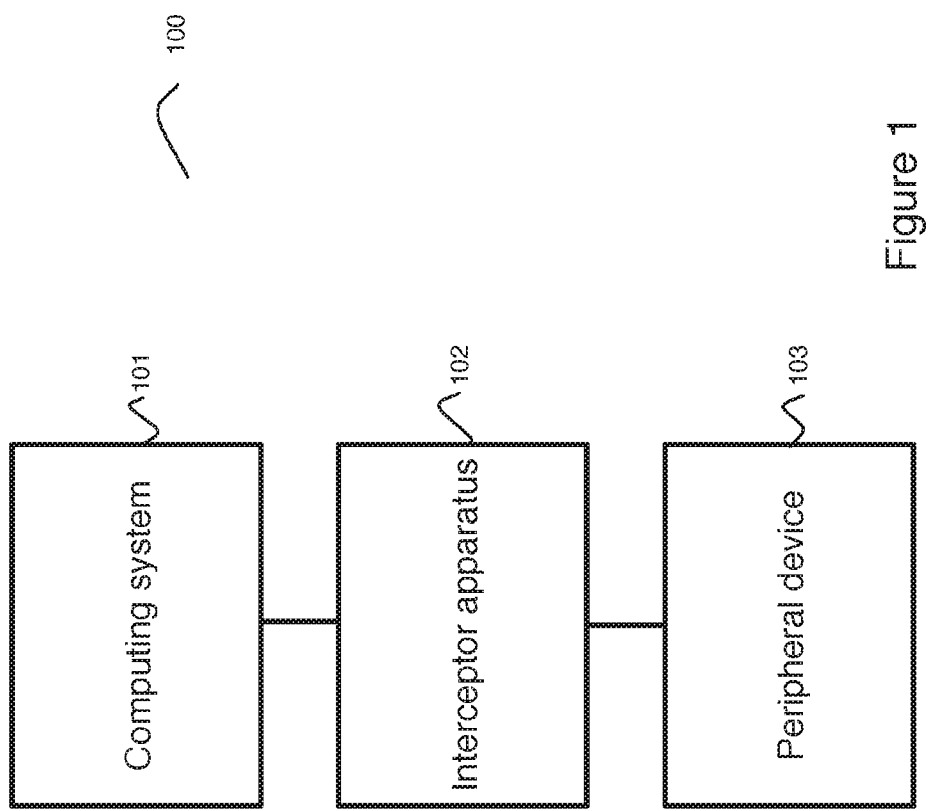
FIG. 1: shows a data processing system in accordance with an embodiment of the invention.

In FIG. 1, a data processing system 100 in accordance with an embodiment of the invention is shown.

A computing system 101 is shown. The computing system 101 is configured to execute a software application. The computing system 101 may be a point-of-sale (POS) terminal configured to execute an electronic point-of-sale (EPOS) software application.

The computing system 101 includes a processor and a memory. The computing system 101 may also include a display and a user input for interacting with a user.

An interceptor module embodied within an interceptor apparatus 102 is shown. The interceptor apparatus 102 is connected to the computing system, 101 for example, by a port on the computing system 101. The connection permits signals to be transmitted and received between the interceptor apparatus 102 and the computing system 101.

The interceptor apparatus 102 includes a processor and a memory. The interceptor apparatus 102 may include a display and a user input for interacting with the user.

A peripheral device 103 is shown. The peripheral device 103 may be an input hardware device, such as a barcode scanner, keyboard, or fuel indicator for petrol station forecourts, or any other type of input device.

In one embodiment, the peripheral device 103 may be an output peripheral device, such as a printer, a cash drawer, or a customer display pole for a point-of-sale terminal. In such an embodiment, the interceptor apparatus 102 may be configured to intercept signals transmitted from the application software to the peripheral device 103.

The peripheral device 103 is connected to the interceptor apparatus 102 such that signals can be transmitted and received between the interceptor apparatus 102 and the peripheral device 103. For example the peripheral device 103 may be connected via a USB connection with the interceptor apparatus 102. It will be appreciated that any other type of connection may be utilised including serial or parallel connections, adapters from one communications type into another such as a serial to USB connector, wireless connections such as wifi or Bluetooth, or proprietary connections such as Apple's lightning connector.

The interceptor apparatus 102 may be configured to initiate a communications channel between the peripheral device 103 and the application executing on the computing system 101. The interceptor apparatus 102 may be further configured to intercept signals transmitted via the communications channel between the peripheral device 103 and the application on the computing system 101.

The interceptor apparatus 102 may be further configured to receive and/or transmit signals transmitted to/from further peripheral devices. The further peripherals devices may not be configured to interface directly with the application software. For example, the application software may be legacy application software and the peripherals may be new peripherals. The further peripheral devices may include an optical scanner, a webcam, an RFID (Radio Freauency IDentification) reader, an NFC (Near-Field Communication) reader and an interactive display.

The interceptor apparatus 102 may be further configured to receive and/or transmit signals from/to an external server via a communications channel across a network such as via Ethernet or wifi.

The interceptor apparatus 102 may be configured to process those signals and to perform an action on the basis of that processing.

Further details on processing will be described in relation to FIG. 5.

In one embodiment, the actions the interceptor apparatus 102 may be configured to perform include blocking the signal from the peripheral device 103 to the computing system 101, replacing the signal with one or more different signals, and/or communicating the signal or data relating to the signal to an external server.

Figure 2:
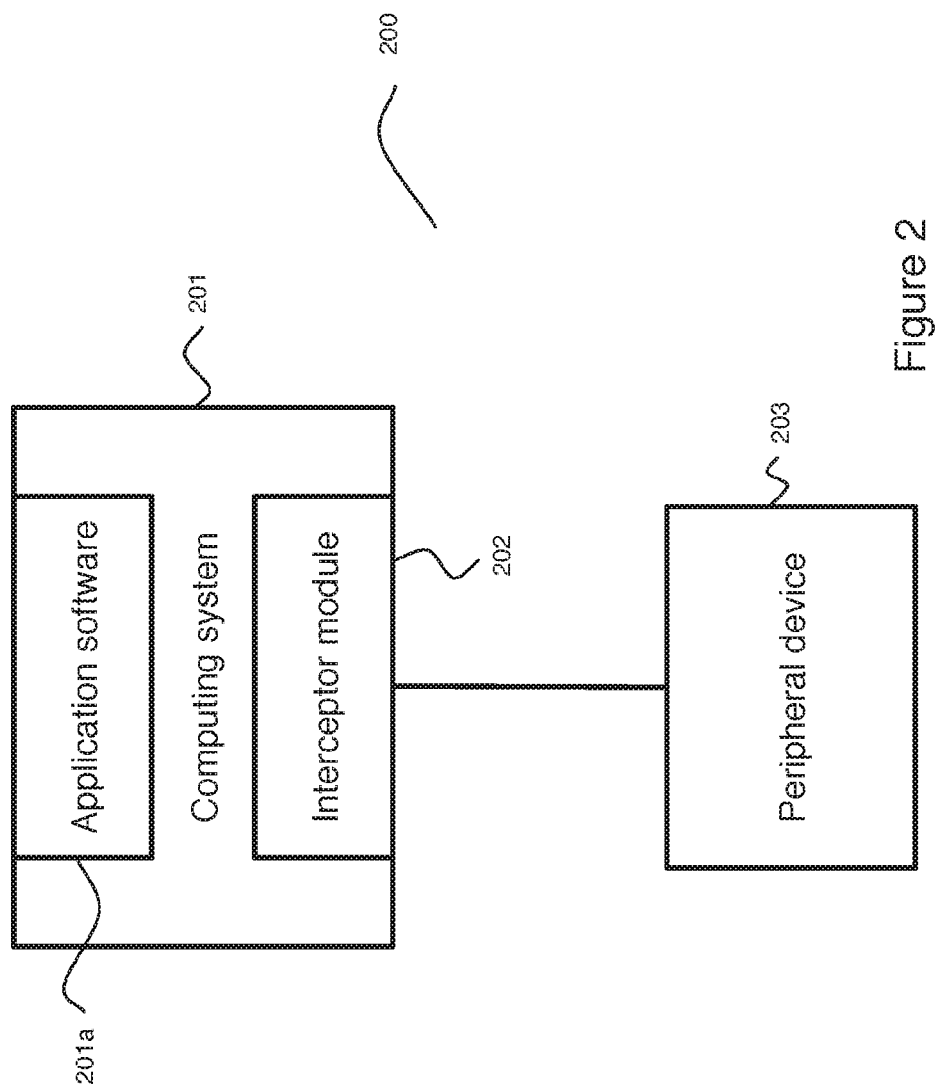
FIG. 2: shows another data processing system in accordance with an embodiment of the invention.

In FIG. 2, a data processing system 200 in accordance with another embodiment of the invention is shown.

A computing system 201 is shown. The computing system 201 is configured to execute a software application 201*a*. The computing system 201 may be a point-of-sale (POS) terminal configured to execute an electronic point-of-sale (EPOS) software application.

The computing system 201 includes a processor and a memory. The computing system 201 may also include a display and a user input for interacting with a user.

The computing system 201 is further configured to execute an interceptor module 202.

A peripheral device 203 is shown. The peripheral device 203 may be an input hardware device, such as a barcode scanner, a keyboard, or fuel indicator for petrol station forecourts, or any other type of input device.

The peripheral device 203 may be connected to the computing system 201 such that signals can be transmitted and received between the peripheral device 203 and the computing system 201. The computing system 201 is further configured to process, interpret, and relay those signals via the operating system and a device driver to the application software 201*a* executing on the computing system 201.

The interceptor module 202 may be configured to intercept signals transmitted from the peripheral device 203 to the application software 201*a*.

In one embodiment, the peripheral device 203 may be an output peripheral device, such as a printer, a cash drawer, or a customer display pole for a point-of-sale terminal. In such an embodiment, the interceptor module 202 may be configured to intercept signals transmitted from the application software to the peripheral device 203.

The interceptor module 202 may be configured to replace the device driver from the perspective of the application software 201*a*, such that signals to and from the application software are routed through the interceptor module 202 to and from the device driver.

The interceptor module 202 may be further configured to receive and/or transmit signals transmitted to/from further peripheral devices. The further peripherals devices may not be configured to interface directly with the application software. For example, the application software 201*a* may be legacy application software and the peripherals may be new peripherals. The further peripheral devices may include an optical scanner, a webcam, an RFID reader, an NFC reader and an interactive display.

The interceptor module 202 may be further configured to receive and/or transmit signals from/to an external server via a communications channel across a network such as via Ethernet or wifi.

The interceptor module 202 may be configured to process those signals and to perform an action on the basis of that processing.

Further details on processing will be described later in the document with reference, in particular, to FIG. 5.

In one embodiment, the actions the interceptor module 202 may be configured to perform include blocking the signal from the peripheral device 203 to the application software 201*a*, replacing or augmenting the signal with one or more different signals, and/or communicating the signal or data relating to the signal to an external server.

Figure 3:
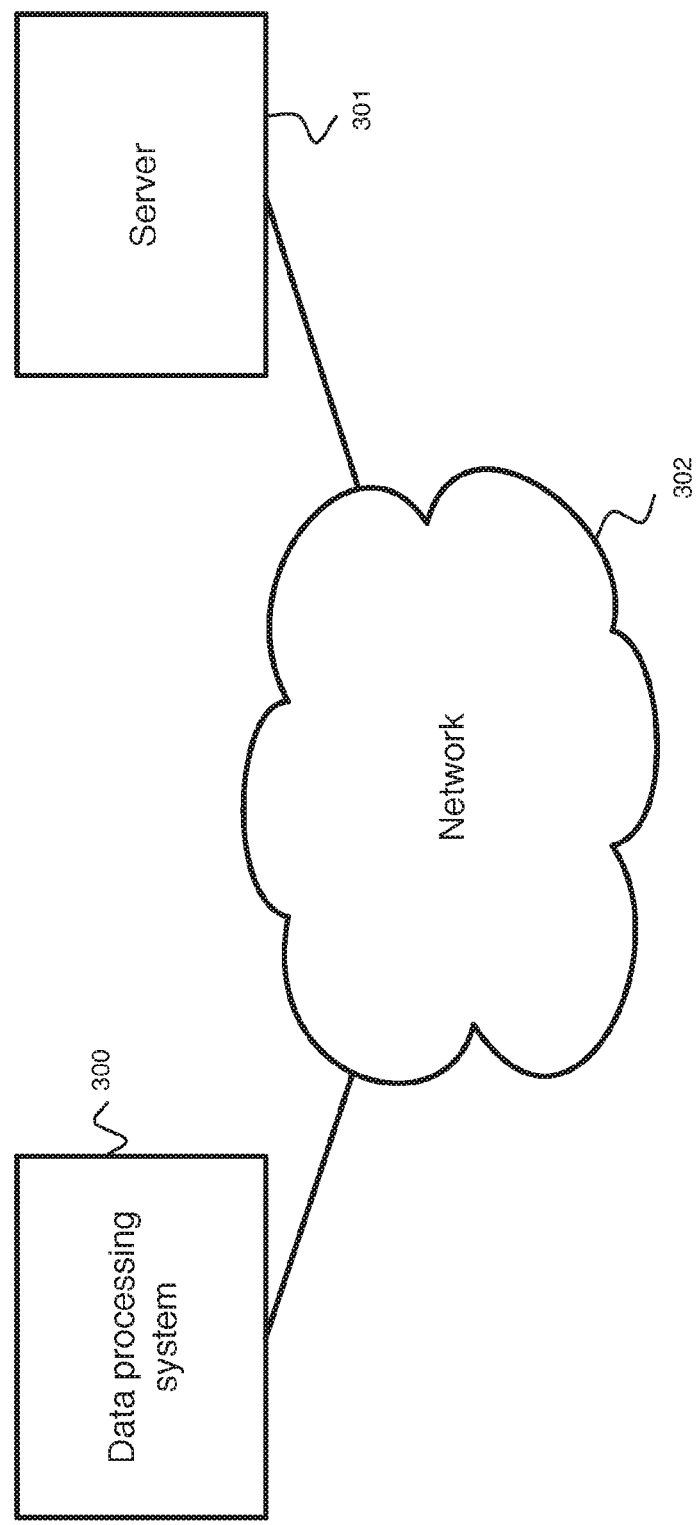
FIG. 3: shows a communications architecture in accordance with an embodiment of the invention.

In FIG. 3, an exemplary deployment of a data processing system within a network architecture in accordance with an embodiment of the invention is shown.

A data processing system 300 as described in relation to FIG. 1 or 2 is shown.

The data processing system 300 may be further configured to communicate with a server 301 via a network 302.

Figure 4:
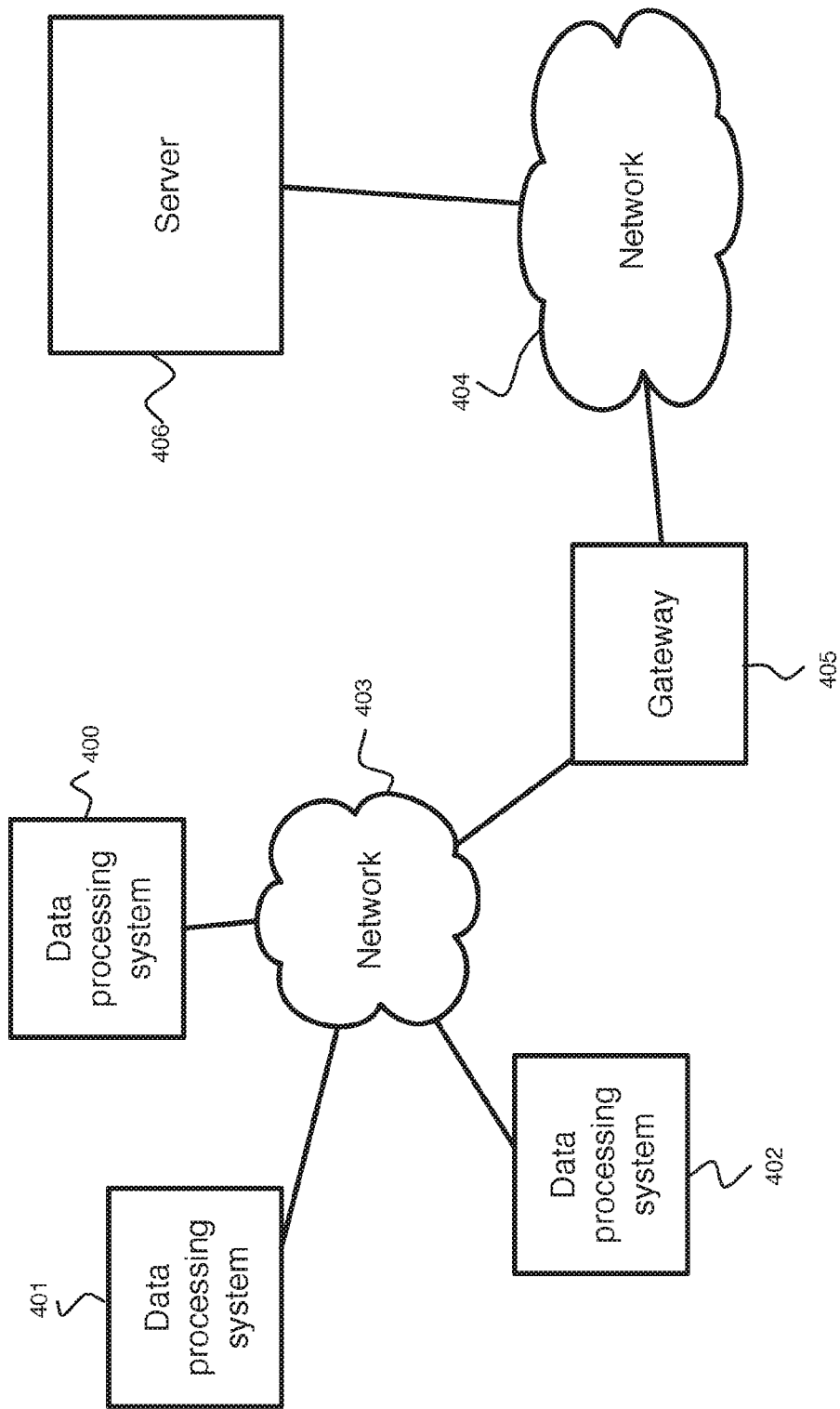
FIG. 4: shows another communications architecture in accordance with an embodiment of the invention.

In FIG. 4, an alternative exemplary deployment of a data processing system within a network architecture in accordance with an embodiment of the invention is shown.

A plurality of data processing systems 400, 401, and 402 as described in relation to FIG. 1 or 2 are shown.

The data processing systems 400, 401, and 402 may be connected to a network 403. The network 403 may be connected to a second network 404 via a gateway 405.

The data processing systems 400, 401, and 402 may be further configured to communicate with a server 406 via the first network 403, the gateway 405, and the second network 404.

It will be appreciated that alternative deployments of the data processing system may be envisaged. For example, with cloud computing architectures, functions may be distributed amongst a plurality of devices or servers, which may be interconnected by various network and communication configurations.

Figure 5:
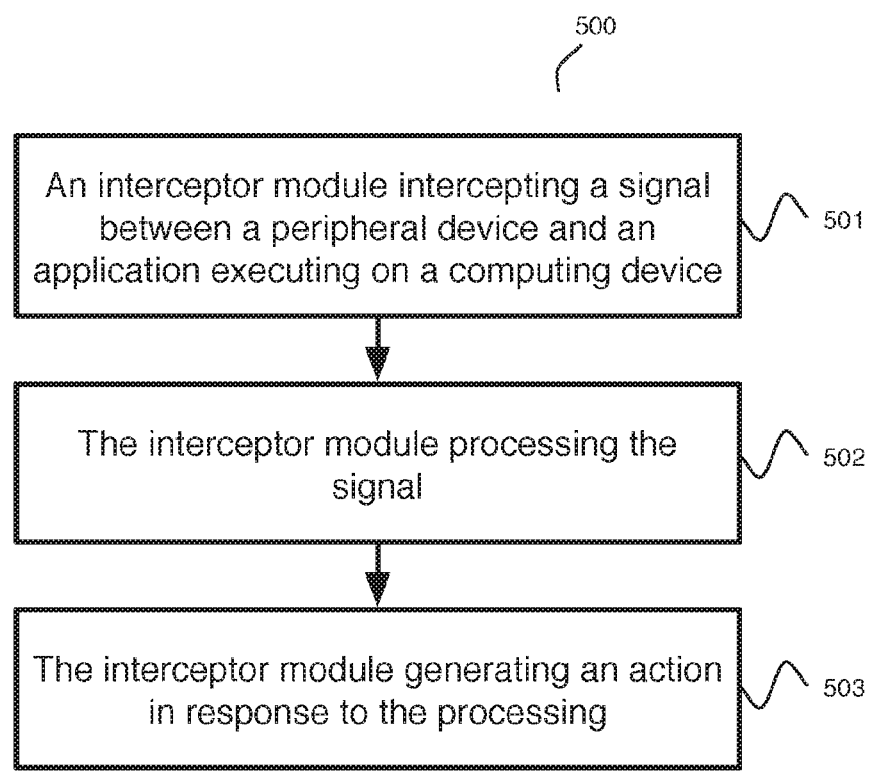
FIG. 5: shows a flow chart illustrating a method in accordance with an embodiment of the invention.

In FIG. 5, a method 500 in accordance with an embodiment of the invention is shown.

In step 501, signals are received from the peripheral device by the interceptor module. The signals may be related to data captured by the peripheral device.

For example, the peripheral device may capture and encode barcode data from printed barcodes.

In one embodiment, signals are instead received from the application going to a peripheral device by the interceptor module. The signals may be related to data intended for output on the peripheral device. For example, the peripheral device may be a till printer.

In step 502, the interceptor module processes the signals.

In one embodiment, the interceptor module may capture all the data relating to the signals but forward the data onto to the application software. For example, it may capture all the barcodes scanned within a particular session (such as a specific customer session). The interceptor module can then build a "basket" of products to be purchased by the customer. One or more barcodes may relate not to a product as such, but may be a coupon for, for example, a discount. The interceptor module can process the captured product information in accordance with rules to determine if conditions defined for the coupon are met before a discount is applied. In order to apply the discount, the interceptor module may permit the ongoing transmission to the application software of the signal relating to the coupon or the interceptor module may generate a specific signal incorporating a pseudo barcode that the application software will interpret as an amount to discount for ongoing transmission to the application software. In one embodiment, a specific coupon may not need to be applied to actuate a discount, but the contents of the basket itself, if complying with rules, may qualify actuation of a discount. In this embodiment, the "coupon" may identify the customer and that specific customer may be eligible for discounts. A look up to a remote server may be made to validate the identity of the customer and/or validate eligibility.

In one embodiment, the interceptor module may as part of the processing, request further information from an external server. The data processing system may communicate with the external server to retrieve this information. For example, the interceptor module may request that a coupon (extracted from the signals) is validated by the external server before it is to be applied.

In one embodiment, the interceptor module may as part of the processing generate the display of a prompt to the operator of the computing system. The prompt may be displayed on a display of the computing system or the prompt may be displayed on an external display connected, for example, to the interceptor apparatus. The operator response to the prompt can be received by the interceptor module and determine whether a coupon or discount should be applied or not.

In step 503, the interceptor module performs one or more actions resulting from the processing.

The actions may include forwarding the signal onto the application software, capturing the signal, or transmitting information to an external server.

Preferably the actions include at least one action which affects the onward transmission within the communications channel of at least one signal such as modifying the signal before forwarding on, blocking the signal, generating one or more new signals for onward transmission, and/or delaying transmission of the signal while awaiting a response to a prompt.

In one embodiment, the interceptor module modifies the signals intercepted from the application software to replace data or insert data into the signals. For example, where the signals are intended for receipt by a till printer, the original signals may incorporate template text; and the interceptor module may replace the template text with new text, FIG. 6 shows the format of signals communicated between the application software and the peripheral device in one embodiment of the invention.

Within that figure:

PID=Packet ID which identifies the type of packet being sent;

ADDR=Address field of device for which the packet is intended;

ENDP=Endpoint;

CRC=Cyclic Redundancy Check; and

EOP=End of Packet.

For input peripheral devices, token packets 600 are transmitted from the application software to the interceptor module and then from the interceptor module to the input peripheral device.

In response to receipt of the token packets 600, data packets 601 are constructed and sent from the input peripheral device to the interceptor module and then from the interceptor module to the application software.

In response to receipt of the data packets 601, status packets 602 are constructed and send from the application software to the interceptor module and then from the interceptor module to the input peripheral device.

The process is reversed where the peripheral device is an output peripheral device.

Figure 7:
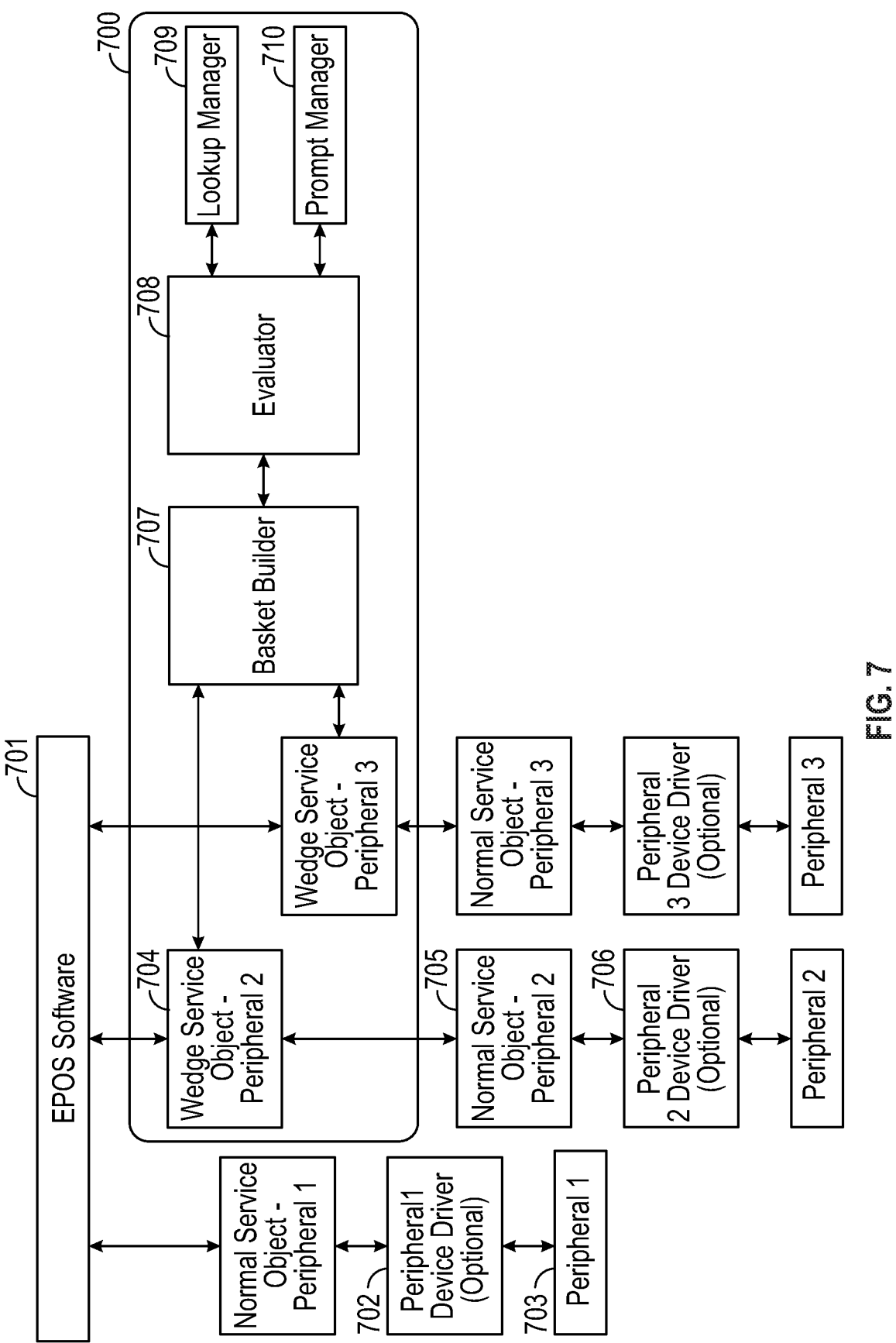
FIG. 7: shows a block diagram illustrating a software interceptor module within an operating system in accordance with an embodiment of the invention.

A software interceptor module 700 in accordance with an embodiment of the invention will now be described with reference to FIG. 7.

The method will be described in relation to the use of a software interceptor module 700 executing on the computing system and in relation to the use for improving a computing system executing a point-of-sale (POS) software application 701.

The software interceptor module 700 is installed at the operating system level on the same device (the computing system) that is hosting the driver software 702 for the peripherals 703.

To create and install the software interceptor module 700:
1. A software object 'wedge' 704 is created which presents the same interface to the POS application 701 as the original peripheral class 705.
2. The FOS software 701 is configured to load the wedge object 704 instead of the original class 705.
3. The 'wedge' object 704 in turn loads the original peripheral driver class 705.

The following description is for POS for.NET but, with suitable modifications, the invention of substituting one object's registration with another would equally well work with other peripheral driver standards such as OPOS (OLE for Retail POS) and JPOS (Java POS).

Initially a software object 704 is created which presents the same interlace to the POS as the original bar scanner class 705. In POS for .NET these objects are called Service Objects or SOs. The POS software 701 must then be configured to load the created SO 704 instead of the original class 705. How this happens will be dependent upon the client software 701. For example, if the client software 701 has a configuration file containing the name of an SO to load then this may be altered to load the wedge 704 instead. If no such configuration file is available and the SO 705 is being loaded by name directly then the replacement object 704 could be given the same name as the original 705 and copied in its place on the filing system, with the original 705 being moved aside to a known location to be loaded manually by the wedge 704.

A POS for .NET service object browser object can be used to retrieve a list of available SOs which may be queried according to the device type they represent. A registry key contains values representing directories where service object binaries reside. This is used by the browser to find SOs. The wedge object's directory is added to this key. A mechanism exists in POS for .NET to redefine the hardware device with which an SO is associated, and this may be used to dynamically link the wedge SO with a particular hardware device ID at installation time. A config file is written which maps the hardware ID to a particular SO's name, and this is placed in a folder which is added to another registry key used by POS for .NET to locate such config files. At device instantiation time POS for .NET will load any config files it finds and dynamically use the mapping contained within to load the appropriate SO for the device with the referenced hardware ID being opened. The ID of the hardware to be replaced can be extracted from metadata exposed by the device's hardware manager.

The wedge SO 704 may be created so that it fully implements the class hierarchy which is being intercepted. For example the POS for .NET standard defines a class for scanners which has at its top level a class called Scanner-Base. This in turn inherits from multiple other classes, all of which can be implemented in order to maintain the inheritance hierarchy and polymorphic nature of the class.

At instantiation time an instance of the original class 705 should be created and held for the lifetime of the wedge object 704. For each publicly accessible method in the hierarchy the implementation is initially replaced with a call to the matching method on the captured object 705 to give a simple pass-through implementation.

Events typically occur when new data arrives. Any events originating in the original class 705 can be similarly overloaded with matching wedge event handlers.

Once this process is complete, when an interface method is called by the POS 701, it is thus calling the associated method on the wedge 704 and when an event is triggered by new data, it is similarly being handled by the wedge 704. As long as the wedge object 704 is simply passing on the methods and events, the POS Software 701 and the peripheral drivers 706 will operate as if the wedge object 704 did not exist.

The wedge 704 can include further processing logic to redirect the method and event data to other software modules 707 to 710 to process the received data and, based on instructions from those modules, replacing, discarding or injecting new data into the original data travelling to/from the peripherals 703.

A sequence diagram showing message flow within a data processing system in accordance with an embodiment of the invention will now be described with reference to FIG. 8.

A barcode is scanned by a barcode scanner and the data is sent in step 800 to the application software for an electronic point-of-sale (EPOS) terminal.

The barcode may be presented for scanning during the scanning of a series of goods for a customer. The series of goods, any coupons, identifiers and payment tokens will be termed a basket.

An interceptor module intercepts the data and sends the data in step 801 to a basket builder and evaluator module.

In one embodiment, if the basket builder and evaluator module does not timely return with instructions to the interceptor module, the interceptor module forwards the data directly to the EPOS as in step 802.

The basket builder and evaluator module adds any goods it identifies within the data to the basket it is tracking for the customer in step 803.

The basket builder and evaluator module may then make a lookup request using the data from a remote server in step 804. For example, if the data relates to a presented coupon rather than a particular good, the basket builder and evaluator may need to verify if the coupon is valid.

The basket builder and evaluator module may evaluate the current basket in step 805 for the customer to determine if the goods within the basket qualify for a particular action (e.g. a discount).

The basket builder and evaluator module may prompt for input from the EPOS user/operator before applying an action in step 806. For example, there may be local conditions that the user is required to verify (e.g. is the customer is over the age of 65 or is female, etc.) These local conditions may be required, for example, in relation to a presented coupon or to the particular discounts presently in effect. Alternatively, the prompt may inform the EPOS operator that a coupon appears to be invalid and giving them the option to accept or reject the coupon; or the prompt may request a code for a one-time CAN (Coupon Authentication Number) protected coupons, which the customer or operator enters (the code may then checked for previous use).

The basket builder and evaluator module may prompt for input at different times during the process.

The basket builder and evaluator module may then generate instructions in step 807 for the interceptor module based on one or more of the constitution of the basket, the validity of any presented coupon and the verification of the required elements.

The instructions may result in the interceptor module performing one of more of forwarding the data unchanged to the EPOS as in step 808, modifying the data and forwarding to the EPOS, or generating and sending data to the EPOS to trigger an action known to the EPOS (for example, applying a discount of a specified amount or percentage) as in step 809.

For example, where two items are scanned in a "50 p off second item offer", the data representing the scanned barcode for the second item may be transmitted to the EPOS and data representing instructions to apply 50 p off discount may be transmitted to the EPOS.

Figure 8:
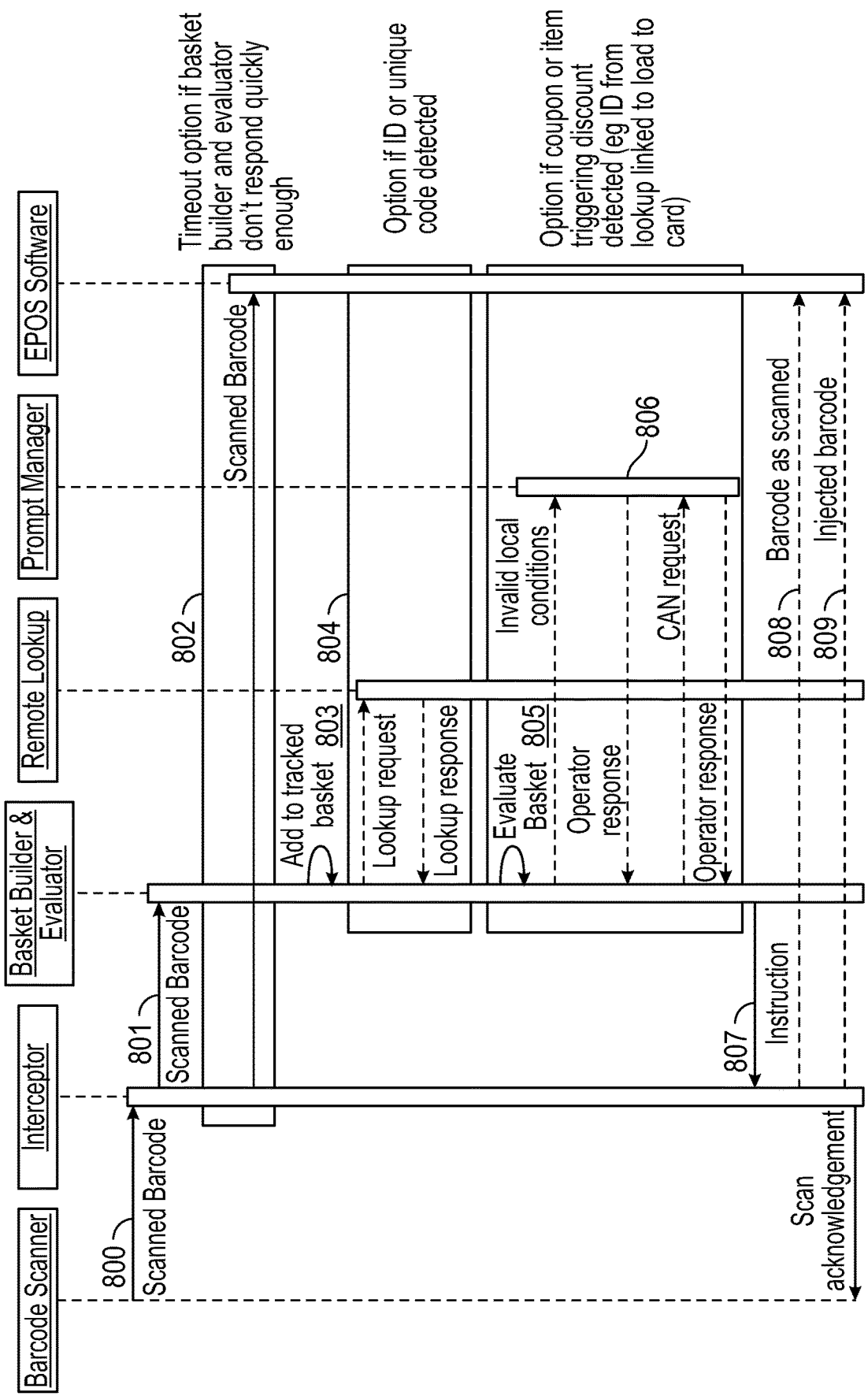
FIG. 8: shows a sequence diagram illustrating message flow within a method in accordance with an embodiment of the invention.

Although FIG. 8 shows a barcode scanner as the source of a barcode scan, the interceptor module can equally intercept data feeds from other peripherals including standard EPOS peripherals (e.g. cash drawer, receipt printer) and proprietary peripherals (in the case of proprietary peripherals data would not be forwarded directly on to the EPOS without modification or replacement as the peripheral is unknown to the EPOS).

Instructions returned to the interceptor by the basket builder and evaluator module can be multiple instructions. So one real barcode scan can lead to multiple injected barcodes (e.g. to trigger the right amount of discount).

The interceptor module can be either hardware or software based with messaging being the same.

A data processing system illustrating an interceptor module within an interceptor apparatus in accordance with an embodiment of the invention will now be described with reference to FIG. 9.

The interceptor apparatus may comprise a processor and memory within a communications hub 900 or within an attached interactive display (a display and an input) 901. The interceptor apparatus may execute the interceptor module. The interactive display may be configured to display prompts to a user of the EPOS terminal generated by the interceptor apparatus and to receive responses from the user. The responses may be utilised to determine the actions performed by the interceptor apparatus.

Communications routed through the hub 900 may be intercepted by the interceptor module.

The communications hub 900 may have USB connections or other communications inputs. Adaptors may be used to connect non-USB inputs/outputs to the USB connections.

Input and output peripherals 902 to 907 may be connected to the communications hub 900.

The communications hub 900 may be connected to an electronic point-of-sale (POS) terminal 908 through one or more communication connections. For example, the POS terminal 908 may utilise industry standard input/output connections such as "scanner in", "printer out", and "cash drawer out".

The communications hub 900 may include a wifi dangle 909 and/or an Ethernet connection 910 to communicate with an external server 911.

In the case of a standard USB input device (such as a barcode scanner), the interceptor module may (in most circumstances) simply pass on the USB packets between the POS (acting as a USB Host) and the peripheral (a USB device).

However, where the interceptor module has been configured (for example) to prompt for a verification of a coupon scanned by a barcode scanner, the behaviour will change. When the interceptor module receives a token packet from the POS requesting any data, the interceptor module will return a NAK status packet indicating that no data is available. This will happen repeatedly until the prompt has been actioned by the user and during this time, no token packet will be passed onto the POS Input Peripheral. If the result of the prompt response is to permit the coupon, the next token packet from the FOS will result in the data packet corresponding to the coupon barcode being returned (otherwise, the coupon data packet is discarded). Assuming no other configurations would prevent it, normal communications between the peripheral and POS may then be resumed.

A potential advantage of some embodiments of the present invention is that additional functionality can be added to an application on a computing system with external peripherals without requiring the application to be modified. Accordingly, a data processing system in accordance with the invention results in an improved computing system can execute legacy software whilst remaining reliable.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A data processing method performed by an interceptor module including a software wedge object, including:
  a) constructing a communications channel between a predefined peripheral device for an electronic point-of-sale (EPOS) terminal and an EPOS application executing on the EPOS terminal; by:
    a. creating the software wedge object which presents an interface to the EPOS application that is the same as an original class for a predefined peripheral device;
    b. the EPOS application loading the software wedge object in place of the original class; and
    c. the software wedge object loading the original class for the redefined peripheral device;
  b) intercepting a plurality of signals within the communications channel using the software wedge object; and
  c) processing the plurality of signals and performing one or more actions in response to the processing,
    wherein at least one action affects onward transmission of one or more of the plurality of signals within the communications channel and wherein at least some of the plurality of signals are data packets.

2. The data processing method as claimed in claim 1, wherein the peripheral device is an input device.

3. The data processing method as claimed in claim 1, one or more of the plurality of signals comprises a single message constructed in a defined message format.

4. The data processing method as claimed in claim 1, wherein the one or more actions include modifying one or more of the plurality of signals and injecting the one or more modified signals into the communications channel for receipt by the EPOS application.

5. The data processing method as claimed in claim 1, wherein the one or more actions include removing one or more of the plurality of signals from the communications channel such that the one or more of the plurality of signals are not received by the EPOS application.

6. The data processing method as claimed in claim 1, wherein the one or more actions include injecting one or more further signals into the communications channel for receipt by EPOS application.

7. The data processing method as claimed in claim 1, further including requesting input from a user of a computing system, and wherein the plurality of signals are processed in accordance with input received from the user.

8. The data processing method as claimed in claim 1, further including receiving a different signal from a further peripheral device, and wherein the plurality of signals are processed in accordance with the different signal and wherein the further peripheral device is not recognised directly by the EPOS application.

9. The data processing method as claimed in claim 1, wherein the plurality of signals are intercepted at an operating system level.

10. The data processing method as claimed in claim 1, wherein the plurality of signals are intercepted by an intermediary hardware device into which the predefined peripheral device is connected and which in turn is connected to a computing system.

11. The data processing method as claimed in claim 1, wherein the processing occurs, at least in part, in accordance with a stored set of instructions.

12. The data processing method as claimed in claim 1, wherein the processing occurs, at least in part, with assistance of an external server.

13. The data processing method as claimed in claim 1, wherein the predefined peripheral device is a barcode reader.

14. The data processing method as claimed in claim 1, wherein the predefined peripheral device is not known to the EPOS application.

15. The data processing method as claimed in claim 1, wherein the at least one action includes modification of at least one of the plurality of signals to augment functionality of the EPOS application.

16. The data processing method as claimed in claim 1, wherein the predefined peripheral device communicates in accordance with a first protocol not known to the EPOS application and wherein the at least one action includes modification of at least one of the plurality of signals to a second protocol known to the EPOS application.

17. The data processing method as claimed in claim 1, wherein at least one of the plurality of signals includes instructions not known to the EPOS application and wherein the at least one action includes replacing the instructions not known to the EPOS application in the at least one of the plurality of signals with instructions known to the EPOS application.

18. A data processing system comprising:
    an interceptor module configured for constructing a communications channel between a predefined peripheral device for an electronic point-of-sale (EPOS) terminal and an EPOS application executing on the EPOS terminal; by:
    a. creating a software wedge object which presents an interface to the EPOS application that is the same as an original class for a predefined peripheral device;
    b. the EPOS application loading the software wedge object in place of the original class; and
    c. the software wedge object loading the original class for the redefined peripheral device and for intercepting signals within the a communications channel; and
    a processor configured for processing the intercepted signals and performing one or more actions in response to the processing, wherein at least one of the actions affects onward transmission of one or more signals within the communications channel and wherein at least some of the intercepted signals include one or more data packets.

19. The data processing system as claimed in claim 18, further comprising:
    the electronic point-of-sale (EPOS) terminal, wherein the electronic point-of-sale (EPOS) terminal is configured for executing the interceptor module.

20. The data processing system as claimed in claim 18, further comprising:
    an interceptor apparatus configured for executing the interceptor module.

21. The data processing system as claimed in claim 18, further comprising:
    a display configured for displaying prompts to an operator of the electronic point-of-sale (EPOS) terminal; and
    an input configured for receiving responses to the prompts from the operator, wherein the processor is further configured for generating the display of prompts and receiving the responses, and wherein the performance of the one or more actions is dependent, at least in part, on the responses.

22. The data processing system of claim 21, wherein the processor is further configured to:
    transmit, to a remote server, request for data relating to one or more of the intercepted signals;
    in response to the request, receiving data from the remote server; and
    the processing includes processing the intercepted signals based on the received responses and the data received from the remote server.

23. The data processing system as claimed in claim 18, wherein the one or more actions include blocking one or more of the intercepted signals from onward transmission within the communications channel, replacing at least one of the intercepted signals with another signal, augmenting at least one of the intercepted signals, and injecting one or more additional signals into the communications channel.

24. A non-transitory computer-readable storage medium having stored therein a computer program for execution by a computer, the computer program, when executed, causes the computer to at least:
    construct a communications channel between a predefined peripheral device for an electronic point-of-sale (EPOS) terminal and an EPOS application executing on the EPOS terminal; by:
    a. creating a software wedge object which presents an interface to the EPOS application that is the same as an original class for a predefined peripheral device;
    b. the EPOS application loading the software wedge object in place of the original class; and
    c. the software wedge object loading the original class for the predefined peripheral device;
    intercept a plurality of signals within the communications channel using the software wedge object; and
    process the plurality of signals and performing one or more actions in response to the processing,
    wherein at least one action affects onward transmission of one or more of the plurality of signals within the communications channel and wherein at least some of the plurality of signals are data packets.

* * * * *